Jan. 27, 1959

T. K. KEHLER 2,870,783

ANNULAR PLATE VALVE

Filed Oct. 20, 1954

INVENTOR
THEODOR KARL KEHLER
BY

Jan. 27, 1959 T. K. KEHLER 2,870,783
ANNULAR PLATE VALVE
Filed Oct. 20, 1954 2 Sheets-Sheet 2

INVENTOR
THEODOR KARL KEHLER
BY

United States Patent Office 2,870,783
Patented Jan. 27, 1959

2,870,783

ANNULAR PLATE VALVE

Theodor Karl Kehler, Vienna, Austria, assignor to Hoerbiger & Co., Vienna, Austria Application October 20, 1954, Serial No. 463,459

Claims priority, application Austria October 23, 1953

4 Claims. (Cl. 137—516.13)

In order to damp the opening shock or blow of self-acting annular valves it is usual to arrange a damping plate between the valve plate and the valve guard. When the valve is closed this damping plate is floatingly held by spring forces between the valve plate and the guard and has the purpose when the valve is opened of absorbing by its inertia some part of the kinetic energy of the valve plate. In order to fulfill this purpose the damping plate should remain at rest until the valve plate strikes against the damping plate and the latter should only then, together with the valve plate and with appreciable lag, move towards the guard. However, when the damping plate is spring-supported with reference to the valve plate the opening of the latter at once causes the damping plate to be set in motion and thereby impairs its efficiency.

A known form of the spring support consequently has the valve plate held by weak springs off the valve guard independently of the damping plate, and the damping plate itself is supported by hard springs with initial tension from the guard. The spring elements of the valve plate are for instance in the form of spiral springs which pass freely through the damping plate and extend from the valve plate to the guard. The spring support of the damping plate is for instance constituted by plate springs of known kind the shape of which essentially corresponds to that of the valve plate, and the ring portions of which are suitably cut through and bent upwards to form leaf springs. These leaf springs, the elastic characteristics of which depend on their length and cross sectional area, press the damping plate in known manner against a stepped shoulder of the corresponding guide ring, by which means an initial tension is imparted to the damping plate before encountering the impact of the valve plate. In this form of spring support, the spring plates must have openings for the spiral springs holding the valve plate, but in the case of small valves this form of spring support is impracticable for lack of space.

An object of the present invention is a spring element which simultaneously exerts a weak force on the valve plate and a more powerful force on the damping plate and which can be accommodated also in valves of small diameter.

The spring element of the invention consists of a spring plate with a small number of long, well bent-up flat spring blades and a great number of short flat spring blades, the long blades passing through appropriate slots in the damping plate and acting directly on the valve plate while the short spring blades press against the damping plate.

For reasons of strength, the outer ring of the spring plate may be left in one piece; the next ring may carry the long blades, and a third or inner ring the short spring blades. The long spring blades are in this case very lightly stressed, since even with the longest lift of the valve plate they are not fully extended but retain a certain amount of curvature, corresponding to the thickness of the damping plate.

For valves having only two annular ports in the seating, a combined spring plate is to be preferred; the outermost ring of the spring plate is then provided, in the manner of the known tongued spring plates, with a great number of short spring blades formed by obliquely slotting the outer edge and bending up the resulting tongues. These short spring blades press against the damping plate. The long spring blades of the second inner ring pass through appropriate slots in the damping plate and press on the valve plate.

In addition to its use for two-ring valves the last-named form of the invention has the further advantage that the outermost ring of the damping plate which if the valve plates moves askew during opening receives the hardest blow, also has the most powerful spring support.

Both embodiments of the invention, i. e. both the spring plate with unslotted outer ring and the combined spring plate with short spring blades on the outer ring, can be used singly or superposed in any number, as plate spring stacks.

By way of example the invention is illustrated on the accompanying drawings as applied to a suction valve.

In each of the illustrated embodiments, reference 1 denotes the valve seat, 2 the valve plate, 3 the damping plate, 6 the valve guard, 7 the central assembly screw, 8 a guide ring with stepped shoulder 9.

Figure 1:
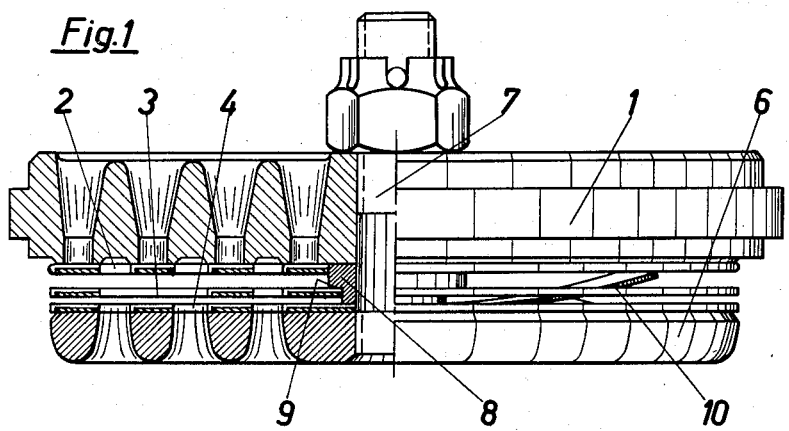
Figs. 1 to 3 show one embodiment, Fig. 1 being an elevation of the valve with the left half in section, Fig. 2 a half plan of the damping plate, and Fig. 3 a half plan of the spring plate which has an unslotted outer ring.
Figure 2:
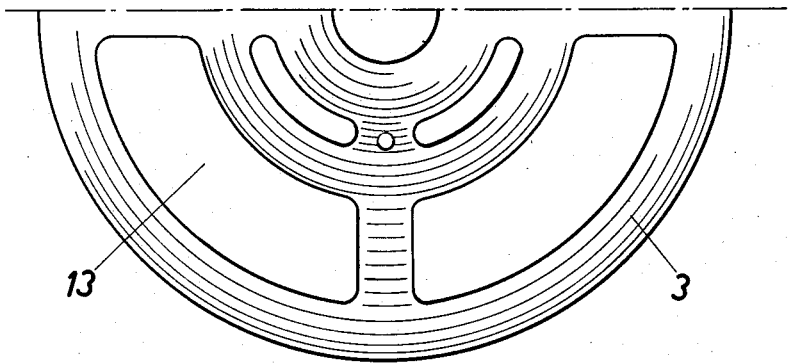
Figure 3:
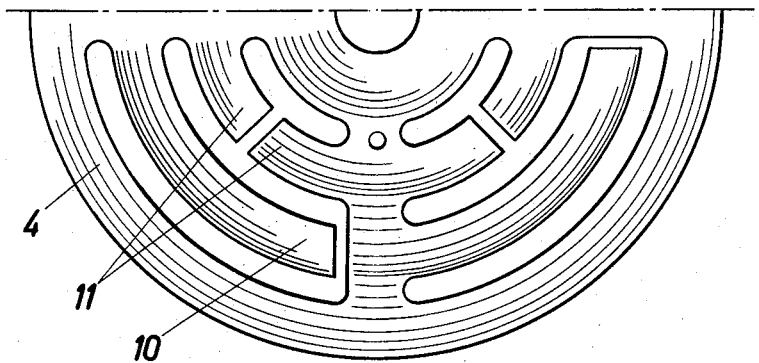

In the embodiment shown in Figs. 1 to 3, reference 4 denotes the spring plate which is formed as shown in Fig. 3 to present the aforesaid long up-bent spring blades 10 and the short spring blades 11. Reference 13 (Fig. 2) denotes the slots in the damping plate. It will be seen (Fig. 1) that the spring blades 10 of the spring plate 4 pass through the slots 13 in the damping plate 3 and act directly on the valve plate 2 while the short spring blades 11 of the said spring plate press against the said damping plate 3.

Figure 4:
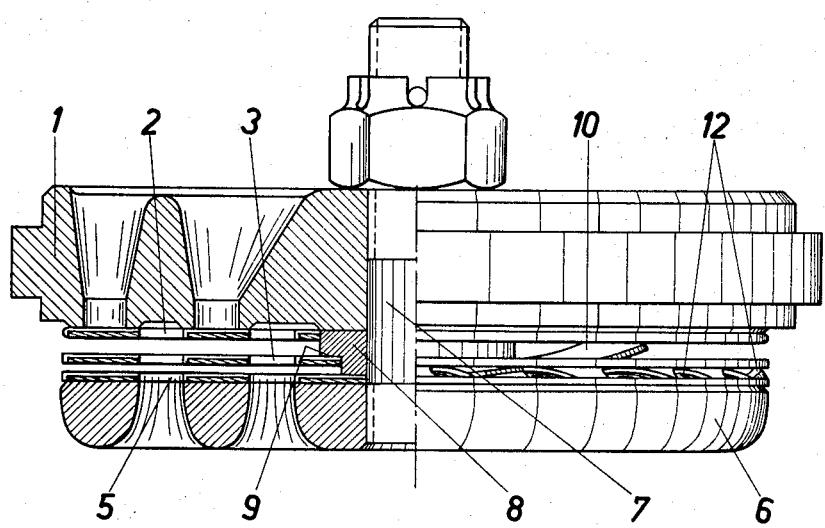
Figs. 4 and 5 show another embodiment, Fig. 4 being an elevation of the valve with the left half in section, and Fig. 5 a half plan of the spring plate which in this instance has a slotted outer edge.
Figure 5:
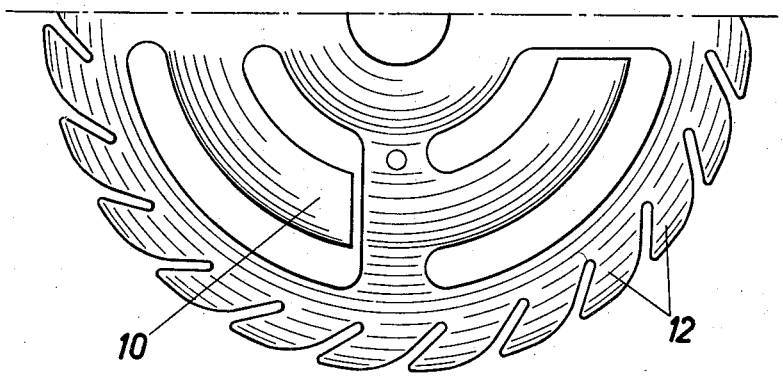

In the embodiments Figs. 4 and 5, reference 5 denotes the spring plate which in this instance has, in addition to the aforesaid spring blades 10, spring tongues 13 at its outer edge, these tongues pressing against the damping plates 3.

I claim:

1. An annular plate valve comprising a valve seat, a valve guard, means connecting said valve seat and said valve guard in spaced relation, a guide member disposed between the valve seat and valve guard, a spring plate supported on said valve guard, first and second spring arms on said spring plate, a damping plate movable axially above the valve guard and guided in the movement by engagement with said guide member, a projection on said guide member for limiting the upper position of said damping plate, said first spring arm yieldingly supporting said damping plate in its upper position, a valve plate movable axially between said damping plate and said valve seat and guided in the movement by engagement with said guide member, said second spring arm yieldingly supporting said valve plate against the valve seat, whereby upon movement of the valve plate toward the valve guard said valve plate will be subject to two stage damping.

2. An annular plate valve comprising a valve seat, a valve guard spaced therefrom, means connecting said valve seat to said valve guard, a guide ring disposed between and of sufficient height to properly space the valve seat and the valve guard, a spring plate supported on said valve guard, two sets of springs projecting upwardly from said spring plate, a damping plate axially movable on said guide ring and above the valve guard, a shoulder on said guide ring for limiting the upper position of said damping plate, one of said sets of springs biasing said damping plate against said shoulder, a valve plate axially movable on said guide ring and disposed above said damping plate and below said valve seat, said damping plate having openings therein aligned with the other of said sets of springs, said other set of springs biasing said valve plate against said valve seat, said one set of springs being stronger than said other set of springs so that two stages of damping of the valve plate may be effected.

3. An annular plate valve according to claim 1, wherein the spring plate comprises rings connected by webs, the outermost of said rings being entirely closed while the inner rings are divided by radial slots to form several spring arms.

4. An annular plate valve as defined in claim 1, the spring plate having slits extending inwardly from its periphery and forming a plurality of short spring blades constituting the damping plate loading arms and also being slotted to provide at least one ring of longer spring blades constituting the valve plate loading arms.

References Cited in the file of this patent

UNITED STATES PATENTS 2,604,296     Kehler _____ July 22, 1952

FOREIGN PATENTS 25,690     Great Britain _____ of 1910
985,711     France _____ of 1951
684,461     Great Britain _____ of 1952